US006490960B1

(12) United States Patent
Jackson et al.

(10) Patent No.: US 6,490,960 B1
(45) Date of Patent: Dec. 10, 2002

(54) MUSCLE-EMULATING PC BOARD ACTUATOR

(75) Inventors: Warren B. Jackson, San Francisco, CA (US); Dave K. Biegelsen, Posto la Valley, CA (US); Lars Swartz, Sunnyvale, CA (US); Patrick Cheung, Castro Valley, CA (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/901,896

(22) Filed: Jul. 11, 2001

(51) Int. Cl.[7] .......................... F16D 31/02; F15B 13/00; F01B 19/00

(52) U.S. Cl. .............................. 91/19; 60/486; 91/525; 92/89

(58) Field of Search .......................... 60/486; 91/7, 12, 91/14, 19, 525, 527, 530, 521, 522, 523; 92/89, 90, 93, 96, 98 R, 101

(56) References Cited

U.S. PATENT DOCUMENTS

| | | | | | |
|---|---|---|---|---|---|
| 489,193 | A | * | 1/1893 | Mills | 92/92 |
| 3,163,985 | A | * | 1/1965 | Bouyoucos | 60/398 |
| 3,561,892 | A | * | 2/1971 | Achermann et al. | 92/89 X |
| 4,548,550 | A | * | 10/1985 | Tsuji | 91/31 X |
| 4,648,385 | A | * | 3/1987 | Oumi et al. | 600/17 |
| 4,939,899 | A | * | 7/1990 | Holzhauer et al. | 180/289 |
| 4,942,735 | A | * | 7/1990 | Mushika et al. | 417/395 |
| 5,362,213 | A | * | 11/1994 | Komatsu et al. | 417/418 X |
| 5,697,285 | A | * | 12/1997 | Nappi et al. | 91/519 |
| 5,709,802 | A | * | 1/1998 | Furuhata et al. | 216/2 |
| 5,860,352 | A | * | 1/1999 | Pabsch et al. | 92/89 |
| 6,055,899 | A | * | 5/2000 | Feit et al. | 92/154 |
| 6,082,105 | A | * | 7/2000 | Miyata | 60/410 |
| 6,098,405 | A | * | 8/2000 | Miyata et al. | 60/535 X |
| 6,173,641 | B1 | * | 1/2001 | Jacobsen et al. | 92/90 |
| 6,240,944 | B1 | * | 6/2001 | Ohnstein et al. | 137/1 |
| 6,247,908 | B1 | * | 6/2001 | Shinohara et al. | 417/413.2 |

* cited by examiner

*Primary Examiner*—John E. Ryznic
(74) *Attorney, Agent, or Firm*—Oliff & Berridge, PLC; Eugene Palazzo

(57) ABSTRACT

A PC board actuator that emulates a muscle fiber includes a first pressure source, a second pressure source lower than the first source, at least one expansion chamber alternately communicating with the first and second pressure sources, first and second valves mounted with the PC board that opens and closes the chamber with respect to the first and second pressure sources, and an actuator member interacting with the expansion chamber to apply a force to the object. The actuator is preferably formed using planar batch technology and the valves preferably comprise electrically controllable flap valves mounted on the PC board. Alternatively, the actuator includes antagonistically arranged expansion chambers that operatively apply reciprocating forces to the object. In other embodiments, the actuator includes plural expansion chambers arranged in series or in parallel in order to increase the overall extent of attainable displacement or to amplify the force generated by the actuator.

30 Claims, 7 Drawing Sheets

MUSCLE-EMULATING PC BOARD ACTUATOR

BACKGROUND OF THE INVENTION

The present invention relates to a mechanical actuator, but more specifically to an electronically controlled pneumatic actuator formed on a substrate, such as a PC board.

Positional control of an object, such as in robotics applications, requires the ability to sense forces acting on and the motion of the object, to exert a force on the object, and/or to perform computations necessary to effectuate control of an actuator that drives the object. While significant progress has been made in the sensing and computational field, developments directed to actuator driving mechanisms have been lacking. It is not known in prior art, for example, how to fully emulate human muscle behavior to move an object.

Desirable actuator characteristics include low-cost, low mass, low power consumption, large range or stroke of operation, small volume, and ease and efficiency of energy conversion to perform mechanical work. Low mass reduces the amount of force required to move the object, thus reducing power consumption. Actuators having these characteristics are particularly suited for use in small force robotic applications and elsewhere that require low mass actuators.

Planar pneumatic muscles have many advantages including ready adaptability to PC Board fabrication techniques. Complex arrays of pneumatic muscle actuators can also be fabricated at reasonable costs. In addition, electrical connections between pneumatic muscles and controllers are easily implemented.

Pneumatic muscles also have lower mass. This contrasts with relatively heavier electric motors that have iron cores and solenoid actuators that have copper windings, for example. Hydraulic actuator systems require seals and containment walls of relatively high mass, which often interfere with the mechanical structure and operation. Pneumatic muscles, on the other hand, have notably low mass, thereby permitting high-speed operations that are frequently required in robotics applications.

In addition, tolerances for fabricating pneumatic muscles are somewhat relaxed in comparison to hydraulic systems because pressure leaks are not believed to be as critical. Moreover, leaks of pressurizing gases, such as air, are less likely to damage surrounding components or endanger the environment or human health. Pneumatic muscle also efficiently converts power to mechanical work.

Pneumatic muscle systems may also be designed with notably large strokes and working ranges. If air is used as a pressuring gas, the force remains relatively constant over the entire stroke range, unlike many mechanical systems. For example, a solenoid actuator requires conventional cores of increasingly greater mass or as the stroke distance increases. A solenoid actuator having a stroke of thirty centimeters, for example, would have significant mass.

Pneumatic muscles fabricated on a PC board can be switched at relatively low pressure levels, e.g., 1 kPa. If electrostatic PC board valves were replaced by electromagnetic solenoid valves, higher pressures of perhaps up to 1 MPa could be achieved thereby permitting larger forces. Electromagnetic solenoid valves can be fabricated using PC Board technology or using impact printer technology. Smaller solenoid air valves are heavier, but not as heavy as corresponding motors required to perform equivalent work.

SUMMARY OF THE INVENTION

In accordance with one aspect of the invention, a pneumatic actuator formed on a PC board produces a force that acts on an object and preferably includes a first pressure source providing a first pressure, a second pressure source providing a second pressure lower than the first source, at least one expansion chamber alternately communicating with the first and second pressure sources, first and second valves formed on the substrate that controllably open and close the chamber with respect to one of the first and second pressure sources, and an actuator member interacting with the expansion chamber to apply a force to the object. The actuator is preferably formed using planar batch technology and the valves preferably comprise electrically controllable flap valves mounted on the PC board.

In another embodiment of the invention, the actuator includes antagonistically arranged expansion chambers that operatively produce and apply reciprocating forces to the object, thereby to move the object in an oscillating manner. In yet other embodiments, the actuator includes plural expansion chambers arranged in series or in parallel in order to increase the overall extent of attainable displacement or to amplify the force generated by the actuator.

According to another aspect of the invention, a pneumatic actuator that emulates a muscle (hereafter, a "pneumatic muscle") uses electronically controlled air valves to generate contraction forces. Reciprocal motion is achieved by using pneumatic muscles or expansion chambers thereof in antagonistic pairs. Valves are fabricated using PC board fabrication techniques in order to minimize costs, simplify communication between the muscle and controller, and minimize weight and volume of valves. PC board fabrication also permits complex combinations of valves, as well as the ability to incorporate valves with flexible substrates.

Other features, aspects, and advantages of the invention will become apparent upon review of the following description taken in connection with the accompanying drawings. The invention, though, is pointed out with particularity by the appended claims.

DESCRIPTION OF ILLUSTRATIVE EMBODIMENTS

Figure 1A:
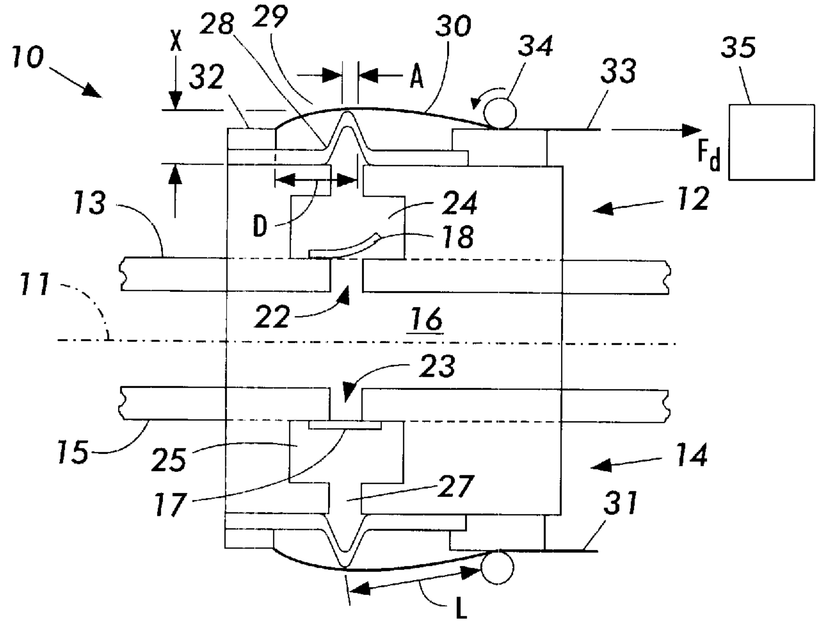
FIGS. 1A and 1B, shown in partial cut-away view, illustrate opposing muscle elements that produce reciprocal forces and displacement in accordance with one embodiment of the present invention.
Figure 1B:
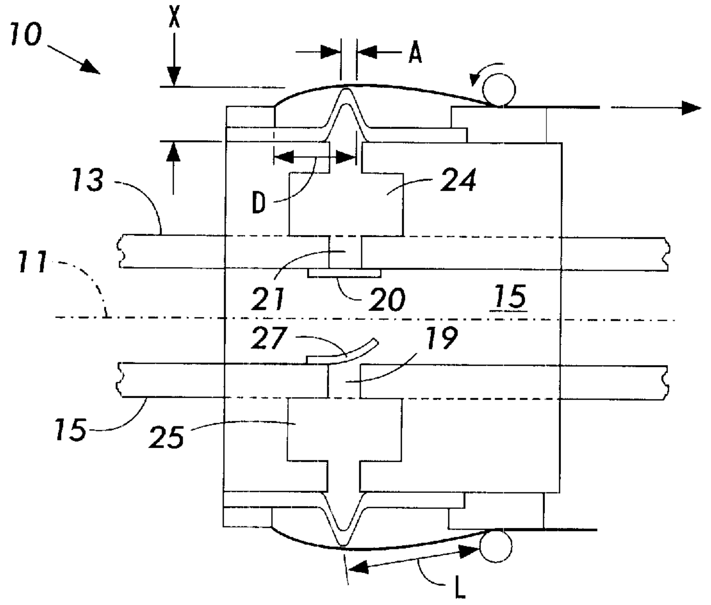
Figure 2:
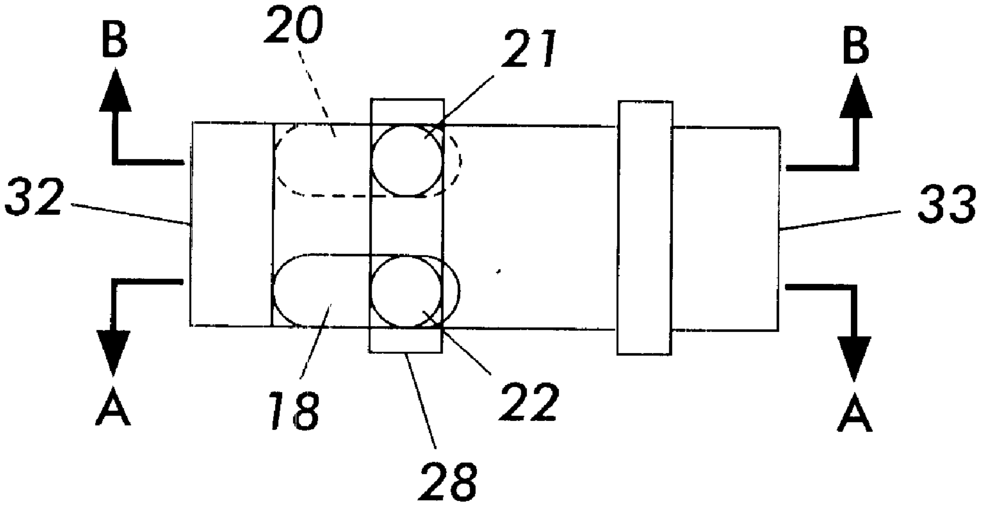
FIG. 2 is a top view of the exemplary muscle element shown in FIG. 1A.

FIGS. 1A, 1B and 2 depict a pneumatic muscle 10 comprising an antagonistic pair of muscle elements 12 and 14 each of which being fabricated on printed circuit (PC) boards 13 and 15 that lie substantially parallel to line 11, perpendicular to the plane of FIG. 1. PC board is here taken to include any electrically insulating material which has patterned thereon metal traces for electrically addressing and driving components connected to the board. FIG. 1A shows in partial cut-away view muscle elements 12 and 14 along a cut across line A—A of FIG. 2 while FIG. 1B shows in partial cut-away view element 12 along a cut across line B—B of FIG. 2. In a preferred form of the apparatus, antagonistic muscle elements 12 and 14 are disposed on opposite sides of a pressure chamber 16 to apply opposing forces that effect movement of an object 35 in a reciprocal manner. To activate a muscle element, a plenum 16 is pressurized to a pressure of about, for example, 50–100 kpa above atmospheric pressure. Pressurization may be achieved by communicating plenum 16 with a source of positive pressure. Pressures of such magnitude can be achieved using electrostatic valves made from modified flow control valves for high-pressure maintenance. Small orifices and large electrostatic electrodes, for example, can maintain pressures of 100 kPa or more. A suitable flap valve is described in commonly-owned U.S. Pat. No. 6,120,002 entitled Fluid Valve Having Cantilevered Blocking Films, which is incorporated herein by reference.

Referring to the upper muscle element 12, it is seen that plenum 16 communicates with a pressurizing orifice 22 through PC board 13 that passes air from plenum 16 via flap valve 18 (FIG. 1A) to an expansion chamber 24. On the other hand, pressure release orifice 20 (FIG. 1B) enables air to pass from expansion chamber 24 through orifice 21 to the ambient atmosphere, a negative pressure source, or a source 15 having a pressure that is lower than the pressure provided by plenum 16. Flow between the expansion chamber 24 and plenum 16, and between the expansion chamber 24 and an ambient atmosphere 15, for example, is respectively controlled by flap valves 18 and 20.

A flexible membrane 28, such as silicone rubber or an elastomer sheet bonded to the muscle element 12, seals the upper side of the expansion chamber 24. Over the elastomer membrane 28, a flexible non-stretching strip of material 30, such as a fiberglass reinforced plastic material, attaches to the housing at point 32. The non-stretching material optionally passes under a low friction constraining material, such as a Teflon rod or roller 34, before it engages the object 35 to apply a force $F_d$. The strip of material 30 may be anchored at other locations along its structure, or at other points with the muscle element.

A corresponding expansion chamber 25 (FIG. 1A), pressuring orifice 23 (FIG. 1A), flap valve 27 (FIG. 1B), and relief orifice 19 (FIG. 1B) are provided in muscle element 14 on the other side of the plenum 16 to produce an opposing force (and displacement) that is applied to object 35. Muscle element 14 has a similar construction and operation as element 12. Element 14 also includes a flexible non-stretching material 31 that engages object 35 with an opposite force. In addition, it should be noted that antagonistic muscle pairs need not be disposed on opposite sides of a substrate or mounted on a rigid substrate. Other arrangements may be constructed without departing from the scope of the invention, such as providing muscle pairs in the same, parallel, or non-parallel planes on a single or multiple substrates. Even flexible substrates may be used. Furthermore, muscle elements need not be applied in pairs. A single muscle element such as 12 can apply a force to an external system, then depressurize expansion chamber through valve 20 during a period when the external system is applying an antagonistic force which need not be countered by the muscle. The various arrangements of the muscle elements will dictate the corresponding various arrangements and attachment points of non-stretching material 30 to effect a variety of corresponding linear, opposing, or other forces. For example, material 30 may be anchored at a mid-point thereof so that its operative relationship with one or more expansion chambers, or an array of expansion chambers, produces opposing forces or motion.

During operation, pressurizing flap valve 18 (FIG. 2) opens to effect an increase of pressure in expansion chamber 24. Flap valve 18, which is preferably formed with or on the PC board, is controlled electrostatically, magnetically, or by other means known in the art, e.g., an electrostatic or magnetic force may act to open or close the flap valve by switching or controlling an applied voltage or a current path. An exemplary flap valve is described in incorporated U.S. Pat. No. 6,120,002. The elastomer material 28 distends thereby causing a buckle 29 to appear in the non-stretching material 30. The end 33 of strip 30 therefore moves towards attachment point 32. When released, pressurizing flap 18 closes under zero-flow conditions through the valve and the pressure release flap 20 is opened to vent pressure from the chamber 24 to source 15 (FIG. 1B), which may be the ambient atmosphere, a vacuum, or a pressure source having a pressure lower than the pressure of plenum 16. The elastomer material 28 assumes its original shape and the non-stretching material 30 is free to return to its original extension.

Force $F_d$ generated by each of muscle elements 12 or 14 is given by the following equation:

$$F_d = -(d/x)\cdot PA$$

where P is the gauge pressure in plenum 16, A is the area of the elastic membrane 28 on which plenum pressure is applied, x (as shown in FIG. 1) is the height of the distended membrane 28, and d is the square root of $(L^2-x^2)$ which is distance from membrane 28 to attachment point 32, and L is the length of the non-stretching strip 30 between its point of contact with the elastic membrane and the attachment point 32. The stroke or range R of the muscle is given by the following equation:

$$R = 2L\cdot\{1-\sqrt{1-x^2/L^2}\}$$

For specific values on the order of, for example, x=0.5 mm, L=4.0 mm, P=100 kPa, and A=2 $mm^2$, a force $F_d$ of about one Newton (Nt) can be generated over a range of 0.5 mm. Also, hold off force=$PA_{orifice}$ can be very small even for high P if $A_{orifice}$ is very small. The trade-off is that the time constant for filling and venting the expansion chamber may be correspondingly longer.

Figure 3:
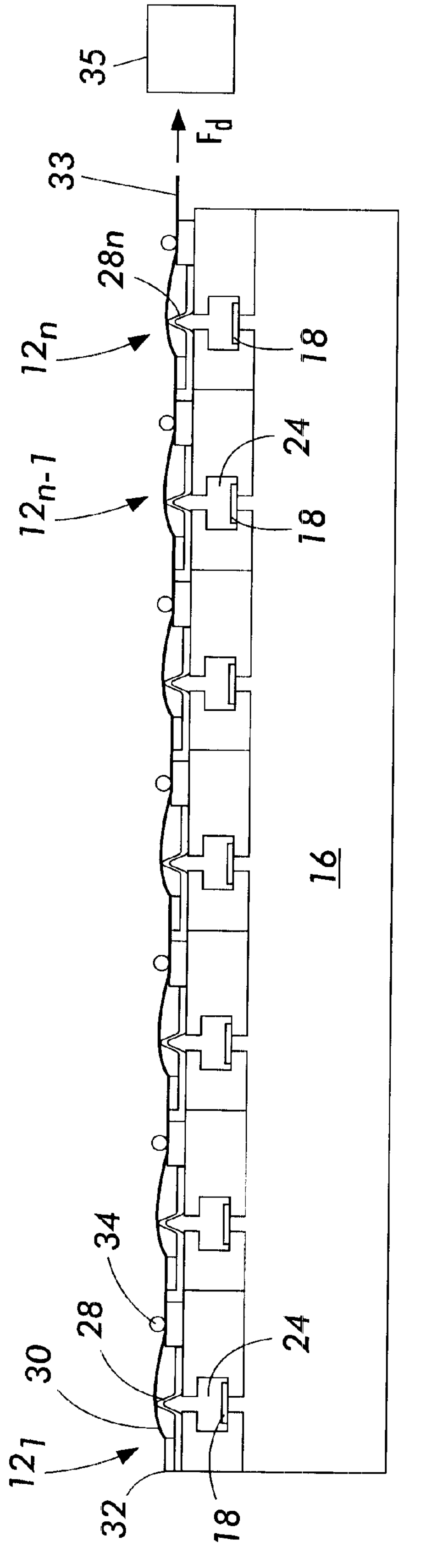
FIG. 3 shows one construction of a planar pneumatic muscle in accordance with another embodiment of the present invention in which the displacement generated is multiplied by a number of muscle elements serially ganged together.

To amplify the excursion of the muscle element or the magnitude of the force $F_d$ generated by the muscle, a multiplicity of muscle elements of the structure described with reference to FIGS. 1 and 2 may be ganged together in series or in parallel. FIG. 3, for example, shows plural muscle elements $12_1$ through $12_n$ connected in series where displacement of object 35 provided by force $F_d$ is increased by a factor of n. Each muscle element communicates with a common plenum 16' and includes a flap valve 18, expansion chamber 24, membrane 28, and optional roller 34. Each muscle element also shares a continuous, flexible strip of a common non-stretching material 30' that is anchored at connection point 32' of the first muscle element $12_1$. The other end 33' of strip 30 engages object 35. To achieve opposing movement of object 35, muscle elements may be arranged in a complementary fashion, similar to that illustrated in FIG. 1. The embodiment shown in FIG. 3, however, has the advantage of being planar and compatible with planar fabrication methods. Costs of fabrication should be low, and reliability is believed to be relatively high.

Alternatively, muscle elements may be ganged together side by side, in parallel, in order to amplify the force $F_d$ rather than the displacement acting on object 35. In this case, the force multiplier is "n," while the range or stroke of the displacement remains unchanged.

Figure 4:
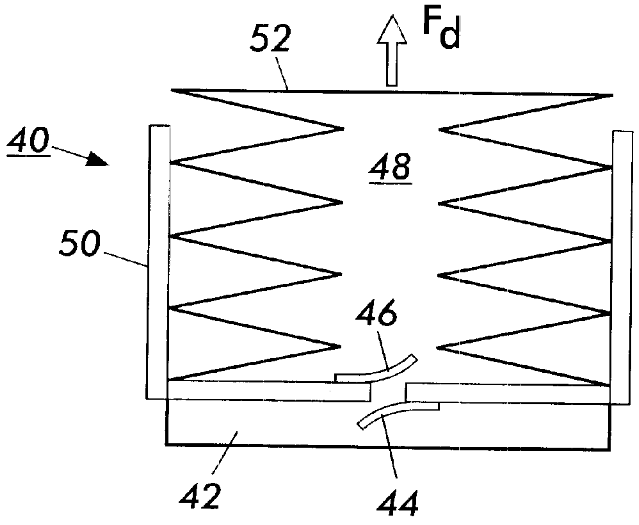
FIG. 4 shows a muscle element constructed in the form of an accordion in accordance with yet a further aspect of the present invention.
Figure 5:
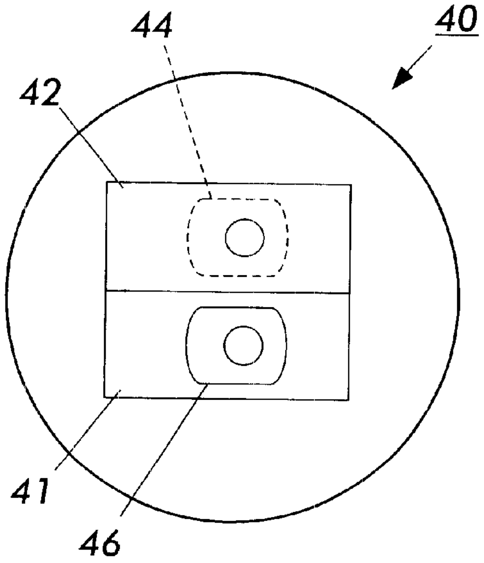
FIG. 5 is a top view of FIG. 4, shown in partial cut-away view.

FIGS. 4 and 5 show a pneumatic muscle element 40 constructed in the form of an accordion. Like the planar muscle element described in connection with FIG. 1, an accordion muscle element may also be fabricated using planar batch technology to form electronically controlled flap valves on a PC board. The accordion muscle element 40 includes an atmosphere or relief plenum 42, pressurizing plenum 41, flap valves 44 and 46, and expansion chamber 48. Optionally, the muscle element 40 may include a cylindrical retention sleeve 50 that helps guide reciprocal expansion and contraction movements of the accordion muscle element. In operation, upon pressurizing chamber 48, force $F_d$ generated at surface actuates an object (not shown). Upon de-pressurization, force $-F_d$ moves the object in an opposite direction. Here, FIGS. 4 and 5 illustrate that antagonizing elements are not required to achieve reciprocating movement of the object.

Figure 6:
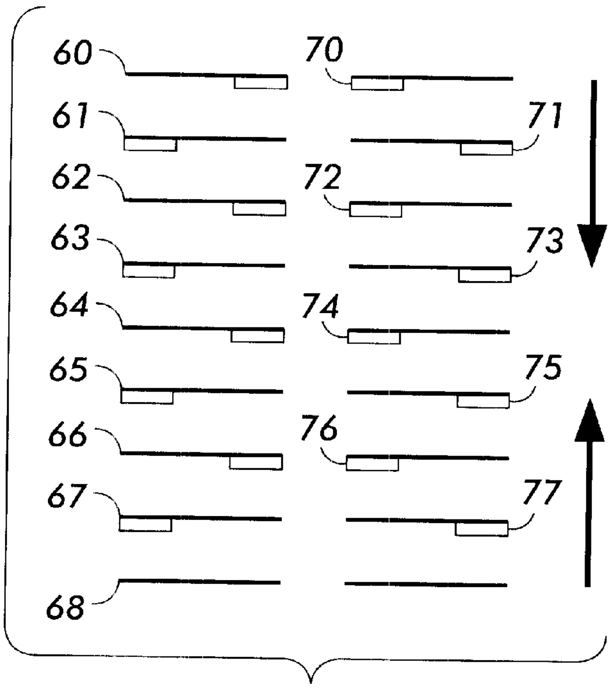
FIGS. 6 and 7 illustrate a preferred method of making the illustrative accordion pneumatic muscle element depicted in FIG. 4.
Figure 7:
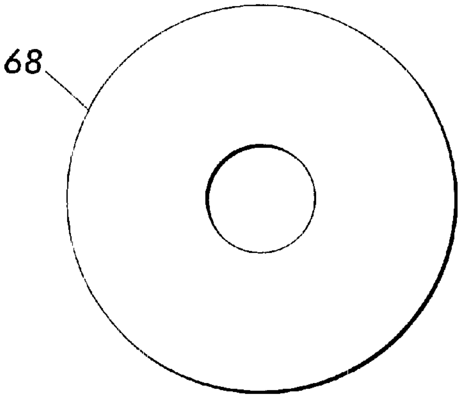

FIGS. 6 and 7 illustrate steps of fabricating the accordion element of muscle 40 shown in FIG. 4. The accordion muscle preferably comprises a series of concentrically aligned annular rings 60 through 67. Rings 60–67 preferably comprise a flexible non-stretching material. A base ring 68 forms one end of the accordion. Rings 60, 62, 64, and 66 have annular adhesive regions 70, 72, 74, and 76 located at or near an inner periphery of the respective rings, while rings 61, 63, 65, and 67 have annular adhesive regions 71, 73, 75, and 77 located at or near an outer periphery. Fabrication of the accordion muscle element includes pressing together (or joining by other means known in the art) alternate inner and outer peripheral edges of the stacked rings 60 through 67 to join the rings at their respective peripheral edges. Fabrication may also include pressing or joining base ring 68 with the adhesive region of ring 67. Other joining methods, for example, include thermal bonding and melting. Included in the formation steps are sealing the respective ends of the muscle and fitting at least one end of the muscle 40 in sealing relation with flap valves. When the muscle element is formed, it is inserted into a structure illustrated in FIG. 4.

When opened, flap valve 46 holds Off the plenum pressure in chamber 41. Exhaust flap valve 44 controls access to the ambient atmosphere or to a vacuum source in plenum 41 if such a source is used in lieu of venting to ambient atmosphere. Increased pressure in expansion chamber 48 causes the muscle element to expand with a consequent displacement of surface 52 which, in turn, moves the object. With pressurizing flap valve 46 closed and the exhaust valve 44 opened, the accordion muscle element 40 contracts in the opposite direction, thereby providing reciprocal motion of the object. The force $F_d$ produced by the pneumatic muscle is given by the following equation:

$$F_d = PA - F_{expansion}$$

where P is the plenum pressure, A is the area of the end cap 52, and $F_{expansion}$ is the force required to expand the accordion. The magnitude of force $F_d$ over the excursion of movement during expansion and contraction cycles is generally dependent upon the extension or displacement of the muscle. The rate R of expansion is given by the following equation:

$$R = C \cdot P / A$$

where C is the conductance of the plenum valve, P is the difference between plenum pressure and the pressure within the accordion, and A is the area of the end cap 52. For many flow regimes, C is proportional to the area of the orifice so that the extension rate of the muscle element is proportional to the ratio of the orifice area to the end cap area.

Figure 8:
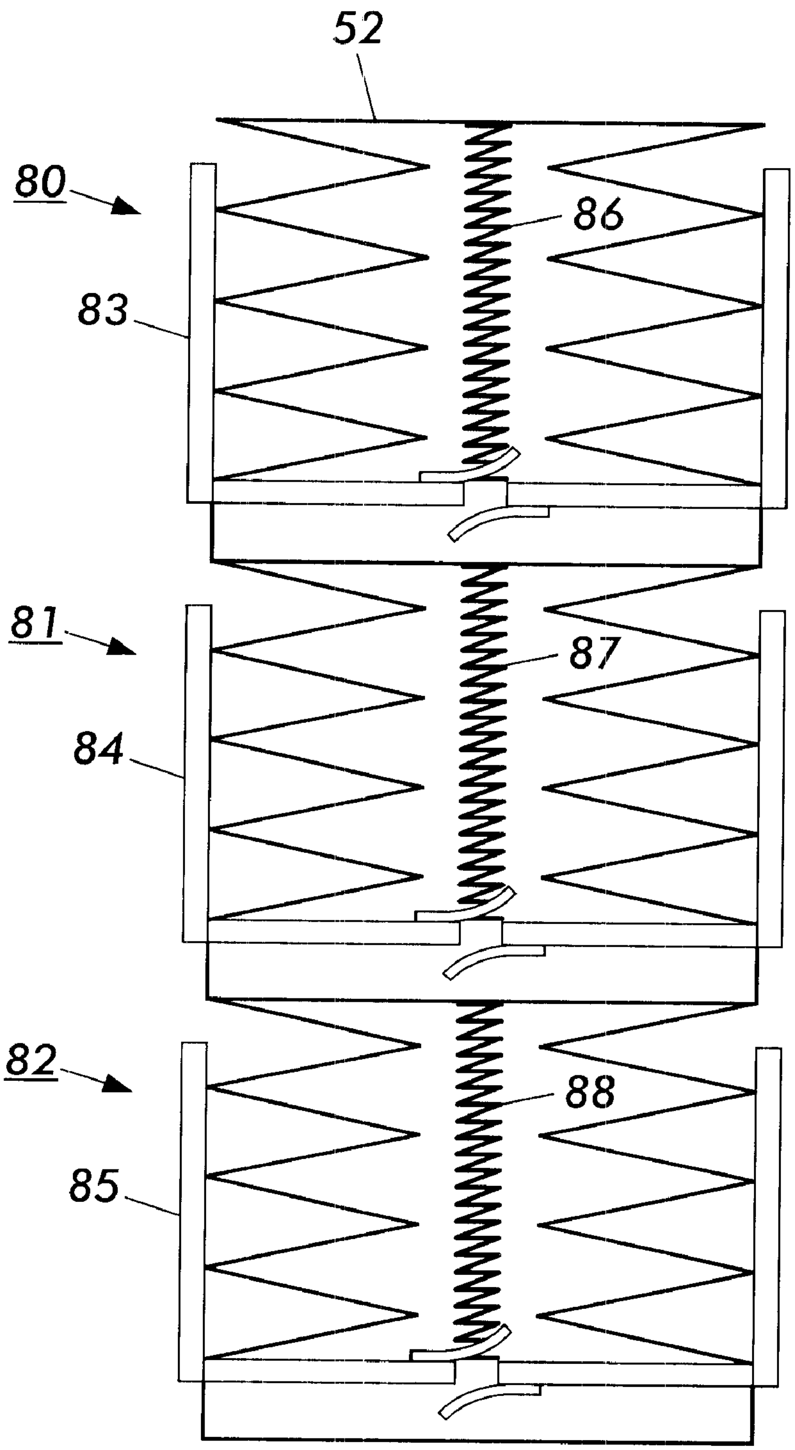
FIG. 8 shows plural longitudinally aligned accordion pneumatic muscle elements in which the displacement generated is multiplied by a number of concatenated elements in accordance with yet another aspect of the present invention.

FIG. 8 shows plural muscle elements 80, 81, and 82 that are arranged in series in order to multiply the extent of attainable displacement. In order to provide lateral rigidity in this arrangement, a series of optional retention sleeves 83, 84, and 85 may be placed around the accordion elements to prevent buckling or shearing of the accordion. Also, if the accordion muscle is to be connected in series (i.e., stacked contiguously), provision is made for passing air and electronic signals between abutting sections of the muscle. In one embodiment, a series of air coils and signal lines 86, 87, and 88 are located within the accordion elements 80, 81, and 82. These lines are structured to provide air communication paths between and among the chambers. Alternatively, the air coils and signals lines may be located externally of the accordion. Any structure that enables the lines to accommodate extension and contraction of the muscle element will suffice, and further, the lines may even be integrated with the walls of the accordion.

Figure 9:
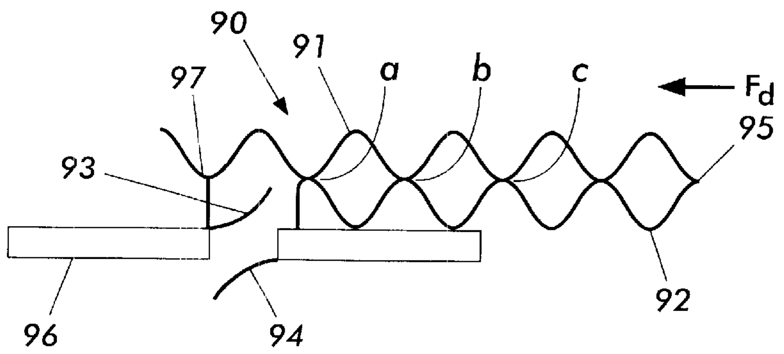
FIG. 9 shows yet another embodiment of the present invention in which the muscle element is constructed in the form of an "air mattress," which comprises a laminated structure that sandwiches plural air pockets or sub-chambers in order to produce reciprocating forces and displacements.

FIG. 9 shows yet another embodiment of the invention. Here, the pneumatic muscle embodiment uses valves to inflate and/or deflate a cellular pad 90 comprising upper and lower wave-like membranes 91 and 92 of flexible non-stretching material having intercommunicating sub-chambers or regions therebetween that are formed by attaching their respective, mating undulating surface regions at a, b, c, etc. The membrane 90 is anchored to plate 96 at an anchor point 97. When inflated during opening of pressurizing flap valve 93, positive air pressure effects expansion of the individual subchambers of the wave-like membranes to draw inward the end point 95. This applies force $F_d$ to an object (not shown) attached to an opposite end of the cellular pad 90. Upon deflation of the respective sub-chambers (by vacuum or otherwise), end point 95 applies a negative force $-F_d$ to the object thereby enabling reciprocal motion. The negative force may be achieved by spring action of the surfaces of membranes 91 and 92 returning to their original shape.

Figure 10A:
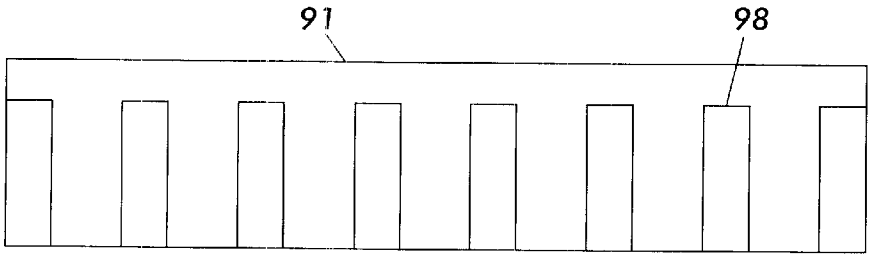
FIGS. 10A and 10B illustrate a preferred method of making the laminated structure depicted in FIG. 9 in accordance with yet another aspect of the present invention.
Figure 10B:
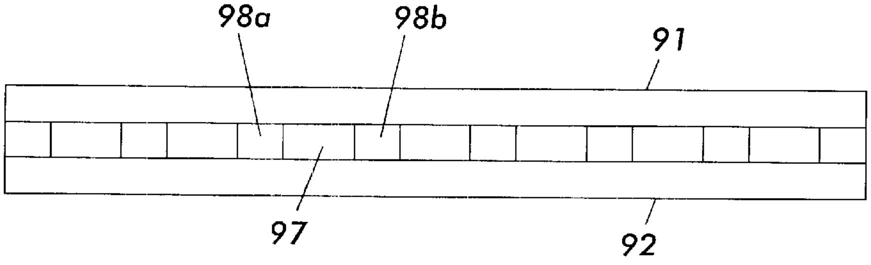

FIGS. 10A and 10B illustrate how the exemplary cellular pad 90 is formed using planar technology. One method preferably includes forming cells or attachment regions by using adhesive or by thermal or chemical bonding. Formation includes attached upper and lower membranes 91 and 92 at respective adhesive attachment points (one of which is shown at 98) thereby to form a lamination shown in FIG.

10B. The resulting laminated structure includes air pockets or sub-chambers 97 embedded in pockets located between adhesive regions, such as adhesive regions 98*a* and 98*b*. Upon pressurization, the sub-chambers expand, as shown in FIG. 9, thereby producing a force $F_d$ that acts on the object.

While the illustrative embodiments are described using air as a medium supplied and expelled from the expansion chamber, the invention in not limited as such. Other gases or fluids, as well, may be used to effect actuation of the muscle. In addition, many types of PC board valves may be deployed even though flap valves are shown and described. Control of such valves may be accomplished by electrical, mechanical, or magnetic means known in the art. As used herein, a pressure or pressure source may be a positive pressure, negative pressure (i.e., a vacuum), or simply an ambient atmospheric pressure, e.g., a region to which a positive or negative pressure is vented. The expansion chamber, distendable member, and actuator member illustrated herein may also take on a variety of forms and structures, as known in the art. Moreover, the illustrative PC board may simply comprise a substrate of any form, with or without printed circuits, and the term "PC board" should be broadly interpreted as such. Methods of fabrication other than those illustrated herein may be employed. Accordingly, the invention includes those modifications and adaptations as may come to those skilled in the art based on the teachings herein.

We claim:

1. A pneumatic actuator comprising:
- a printed circuit board;
- a first pressure source that provides a pressure;
- a second pressure source that provides pressure lower than the first source;
- a first expansion chamber;
- a first and second valve pair mounted with the PC board that open and closes the chamber with respect to the first and second pressure sources to pressurize and vent the first expansion chamber, respectively;
- a first actuator member interacting with the first expansion chamber to apply a force to an object.

2. The pneumatic actuator recited in claim 1, further including:
- a second expansion chamber, and
- a third and fourth valve pair mounted with a printed circuit board that opens and closes the second expansion chamber with respect to first and second pressure sources to pressurize and vent the second expansion chamber, respectively; and
- a second actuator member interacting with the second expansion chamber to apply an opposite force to the object.

3. The pneumatic actuator as recited in claim 1, wherein the expansion chamber includes an elastic membrane that expands in response to pressurizing the chamber and that engages the actuator member to apply the force to the object.

4. The pneumatic actuator as recited in claim 3, wherein said actuator member comprises a flexible, non-stretching material that contacts said elastic membrane; one end of the non-stretching material being attached to a fixed point and one other end of said non-stretching material actuates the object.

5. The pneumatic actuator as recited in claim 4, where said actuator is fabricated using planar fabrication methods.

6. The pneumatic actuator as recited in claim 1, wherein the valves comprise first and second flap valves that control at least one of pressurization and venting of the chamber.

7. The pneumatic actuator as recited in claim 2, wherein the valve pairs and pressure chambers are mounted with the same PC board.

8. The pneumatic actuator as recited in claim 6, wherein said first and second flap valves are electrostatically controlled printed circuit board valves.

9. The pneumatic actuator as recited in claim 6, wherein said first valve comprises an electromagnetic solenoid valve.

10. The pneumatic actuator as recited in claim 2, wherein the first and second actuator members are operatively arranged to effect reciprocal movement of the object.

11. The pneumatic actuator as recited in claim 1, further comprising plural expansion chambers operatively arranged in series in order to multiply the extent of displacement of the object effected by the actuator.

12. The pneumatic actuator as recited in claim 1, further comprising plural expansion chambers operatively arranged in parallel in order to multiply the extent of force applied to the object by the actuator.

13. The pneumatic actuator as recited in claim 11, wherein said plural expansion chambers share a common non-stretching strip that is anchored to a fixed point at one end and that engages the actuator member at one other end.

14. The pneumatic actuator as recited in claim 11, wherein said plural expansion chambers share a common non-stretching strip anchored at a point within an array so as to effect actuation in two opposing directions.

15. The pneumatic actuator as recited in claim 10, wherein the antagonistic pair of expansion chambers shares a common plenum.

16. The pneumatic actuator as recited in claim 11, wherein the expansion chambers are arranged in series share a common source of pressure.

17. The pneumatic actuator as recited in claim 1, wherein the expansion chamber comprises a variable volume accordion structure.

18. The pneumatic actuator as recited in claim 17, wherein the accordion structure is fabricated by sequentially bonding annular rings and, after bonding, mounting the rings on a printed circuit board.

19. The pneumatic actuator as recited in claim 18, further comprising a protective sleeve located around the accordion structure thereby to enhance lateral rigidity.

20. The pneumatic actuator as recited in claim 1, wherein the expansion chamber comprises a cellular "air-mattress" pad that includes a laminated structure sandwiching a plurality of air pockets.

21. The pneumatic actuator as recited in claim 20, wherein one end of the pad effects engagement of the actuator member with the object to be actuated and another end of the pad is attached to a fixed point.

22. The pneumatic actuator as recited in claim 20, wherein the pad is fabricated by attaching plural attachment regions between respective cells of the pad.

23. The PC board as recited in claim 22 wherein the attaching is performed using at least one of an adhesive, chemical bonding, and thermal bonding.

24. An actuator comprising:
- a substrate;
- a first pressure source that provides a first pressure;
- a second pressure source that provides second pressure lower than the first source;
- at least one expansion chamber;
- first and second electrically controllable valves formed with the substrate that controllably open and close the chamber with respect to one of the first and second pressure sources; and
- an actuator member interacting with the expansion chamber to apply a force to an object.

25. The actuator as recited in claim 24, wherein said valves comprise flap valves.

26. The actuator as recited in claim 25, comprising plural expansion chambers arranged in series.

27. The actuator as recited in claim 25, comprising plural expansion chambers arranged in parallel.

28. An antagonistic actuator assembly comprising:

a substrate:

a first pressure source that provides a first pressure;

a second pressure source that provides a second pressure lower than the first source;

a pair of expansion chambers; and first and second electrically controllable valves formed on the substrate that alternately opens and closes each of the chambers in the pair of chambers with respect to one of the first and second pressure sources to effect reciprocal movement of an actuator member, the actuator member interacting with the expansion chamber to apply reciprocal forces to an object.

29. The antagonistic actuator assembly as recited in claim 28 wherein said valves comprise flap valves mounted on the substrate.

30. The antagonistic actuator assembly as recited in claim 28 further including a common non-stretching strip of material operatively engaged with said expansion chamber to produce opposing forces in accordance with expansion and venting of said expansion chambers.

* * * * *